United States Patent [19]
Weisgerber et al.

[11] 4,045,660
[45] Aug. 30, 1977

[54] METHOD AND APPARATUS FOR AUTOMATICALLY REALIGNING A MACHINE ELEMENT TO A PREDETERMINED POSITION AFTER POWER INTERRUPTION

[75] Inventors: William Robert Weisgerber, Springdale; Ralph Charles Taylor, Westchester, both of Ohio

[73] Assignee: Cincinnati Milacron Inc., Cincinnati, Ohio

[21] Appl. No.: 681,573

[22] Filed: Apr. 29, 1976

[51] Int. Cl.² .................. G05B 19/18; G06F 15/46
[52] U.S. Cl. .............................. 235/151.11; 318/632
[58] Field of Search ............... 235/151, 11; 318/632

[56] References Cited
U.S. PATENT DOCUMENTS 3,802,622  4/1974  Nishimura et al. ............. 235/151.11
3,889,105  6/1975  Schneekloth .................... 235/151.11

*Primary Examiner*—Eugene G. Botz
*Attorney, Agent, or Firm*—C. Richard Eby

[57] ABSTRACT

A method and apparatus are disclosed for automatically realigning a machine element to a predetermined position after an interruption of power to a drive mechanism coupled to the machine element. After the termination of power, the apparatus measures a displacement of the machine element during a predetermined period of time; and this displacement is stored in a nonvolatile memory. When power is restored to the drive mechanism, the apparatus is operative to automatically move the machine element back through a distance equal to the stored displacement. Consequently, the machine element realigns to the position it had before the power interruption.

15 Claims, 6 Drawing Figures

METHOD AND APPARATUS FOR AUTOMATICALLY REALIGNING A MACHINE ELEMENT TO A PREDETERMINED POSITION AFTER POWER INTERRUPTION

BACKGROUND OF THE INVENTION

The invention relates generally to the area of numerical controls, and specifically, the invention provides a method and apparatus for automatically realigning a machine element to a predetermined position after an interruption of power thereto. With most prior art numerically controlled machines, an interruption of power must be followed by a realignment procedure after power is reapplied. In simpler machines, a realignment may be executed by moving the machine element to a predetermined alignment position and establishing values in the numerical control corresponding to this predetermined alignment position. However, on larger profiling milling machines, the realignment is more complex. The machine bed may range from 50 feet to several hundred feet long. Further, the machine bed may have several independently operating multiple spindle gantries associated with it. if predetermined alignment points are used, excessive time is consumed in moving the gantry the length of the bed to these points. Further, since each gantry operates independently, there is a high probability that one gantry would interfere with another gantry's attempt to reach an alignment point. Therefore, the operations of all the gantrys have to be terminated to execute an alignment of one gantry. This, of course, is a very inefficient operation. The disclosed method and apparatus provides for an automatic realignment of the machine elements after the interruption of power thereto.

In some more recent controls, during a power interruption, a nonvolatile memory is used to store a command signal representing the desired position and a current feedback signal representing the actual position of the machine element. When power is reapplied, the command and feedback signals are recalled from memory and identify the exact position of the machine element relative to its desired position.

On smaller machines, the above system may be adequate. However, on larger machines, there are conditions which cause the above system to be inadequate. First, there are several factors which will cause the machine element to move after power is terminated. For example, if a power interruption occurs while the machine element is moving inertia will cause the machine element to continue its motion for a short period. Further, in many drive mechanisms, when power is removed, the mechanism will relax slightly until it reaches a state of unenergized stability. This, of course, results in a small motion of machine element.

Second, many systems have a servo balance offset which produces a constant small fixed error between the desired and actual positions of the machine element. Therefore, as power is interrupted and reapplied, the servo balance offset may change thereby changing the actual position of the machine element relative to its desired position. Consequently, a control system that only stores the desired and actual positions of a machine element at the time of a power interruption would be insensitive to changes in position of the machine element occurring after the power interruption.

The disclosed method and apparatus takes into consideration the above problems and provides a system for any machine which automatically realigns a machine element to its precise position after a power interruption thereto.

SUMMARY OF THE INVENTION

According to one embodiment of the invention, a method and apparatus are provided for automatically realigning a machine element to a predetermined position in response to an interruption of power to a drive mechanism coupled to the machine element. First a termination of power to the drive mechanism is detected. Next, the displacement of the machine element after the termination of power is measured and stored. When power is reapplied to the drive mechanism, the machine element is automatically moved through a distance equal to the stored displacement thereby causing the machine element to achieve the position it had before power was terminated. However, there may arise situations where the machine element moves after its initial motion was measured and stored. To accomodate this situation, and the servo balance offset problem, a further embodiment is disclosed for moving the machine element after power is reapplied in a manner neutralizing the above motions. Therefore, even in the most complex situation the machine element is restored to its original position.

DESCRIPTION OF THE PREFERRED EMBODIMENTS

Figure 1:
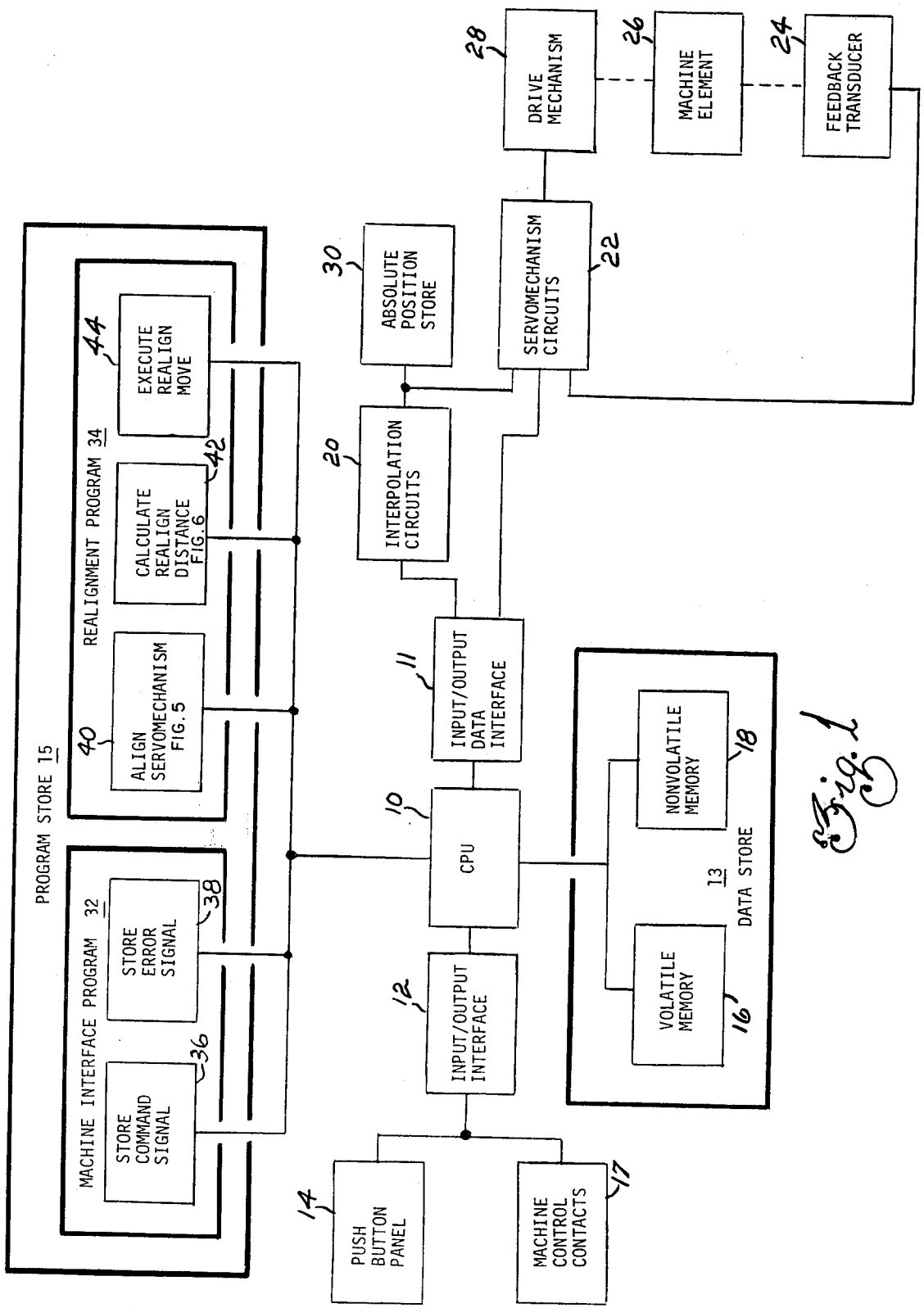
FIG. 1 is a general block diagram illustrating the component parts of the invention.
Figure 2:
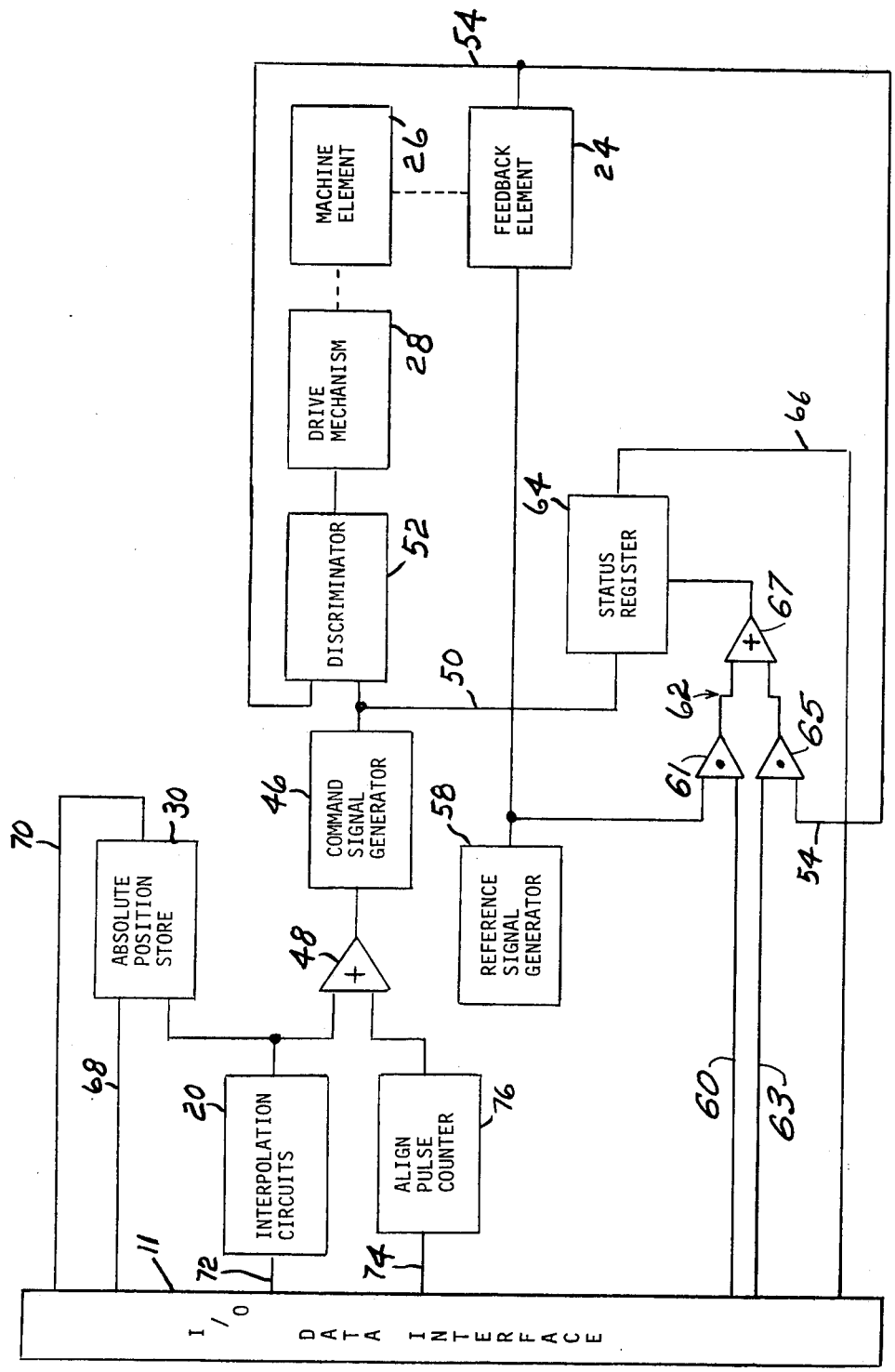
FIG. 2 is a detailed block diagram illustrating the specific components of the servomechanism circuit which are required to implement the invention.

FIG. 1 is a general block diagram illustrating the components of the invention. Generally speaking, the invention is most readily applied to a machine tool being controlled by a computer numerical control. The block diagram of FIG. 1 discloses only the parts of a computer numerical control which are pertinent to the disclosed invention. The elements as shown in FIGS. 1 and 2 are those used in an ACRAMATIC CNC numerical control manufactured by Cincinnati Milacron Inc. However, the exact definition and association of these elements may vary from one numerical control to another. The disclosed invention may be implemented in any computer numerical control containing a nonvolatile memory. Therefore, the exact details of the association of the elements shown in FIGS. 1 and 2 should not be considered as limitations on the claimed method and apparatus.

A central processing unit (CPU) 10 is responsive to an input output interface 12 having inputs generated by a push button panel 14 and machine control contacts 16. The power to a machine tool may be interrupted for a number of reasons. First, a machine shut down may be desired by the operator. In this situation, he would use push buttons available on the push button panel 14 to first turn off power to the machine and thereafter turn off power to the control. In other situations, error conditions may occur which energize machine control contacts operative to terminate power to the machine. In this situation, power to the control may or may not be terminated. In either of the above situations the automatic realignment circuit is operative. However, one limitation is that power must be maintained to the control for a predetermined period of time after power to the machine has been interrupted. Therefore, in situations where power to the machine and the control is interrupted simultaneously, the automatic realignment apparatus is inoperable.

Also associated with the CPU 10 is a data store 13 and a program store 15. The program store 15 supplies programs to the CPU 10 which are operative with selected data from the data store 13 to generate output signals. The data store 13 is comprised of a volatile memory 16 and a nonvolatile memory 18. Under normal operating conditions, with power being maintained to the control, the nonvolatile memory is operative to store most of the active data. However, in the special situation, relevant to the disclosed invention in which power is terminated to the control, automatic realignment data is stored in the nonvolatile memory 18.

Under normal circumstances, in executing a move, the output signals from the CPU 10 pass through an input/output data interface 11 into interpolator circuits 20. The interpolator circuits respond to the output signals and generate a digital signal to servomechanism circuits 22. The servomechanism circuits also respond to a feedback transducer 24 mechanically connected to a machine element 26 and produce an error signal to the drive mechanism 28. The servomechanism circuits continue to produce an error signal until the drive mechanism has moved the machine element 26 to a position such that the feedback transducer 24 produces a feedback signal corresponding to the digital signal generated by the interpolator circuits. An absolute position store 30 is also responsive to the interpolator circuits for storing the absolute position of the machine element.

To simplify the explanation only a single machine element has been illustrated. As will be appreciated by those who are skilled in the art, when the machine has a number of degrees of freedom, the position store 30, servomechanism circuit 22, drive mechanism 28, machine element 26, feedback transducer 24 would be duplicated to correspond with the number of degrees of freedom on the machine.

As mentioned earlier, the invention requires that power to the machine be interrupted first before power to the numerical control is terminated. FIG. 1 does not illustrate any power connections. However, the distribution of power to the machine and the various control elements is well-known. Further, for purposes of this specification, the interruption of power to the machine will be defined as interruption of power to the drive mechanism 28. The interruption of power to the control will be construed as interruption of power to the other elements in FIG. 1. The power supplied to the drive mechanism 28 may be electric, hydraulic or pneumatic.

For example, in a hydraulic system, power to the machine or the drive mechanism 28, may be interrupted because of loss of power to an electric pump generating the hydraulic power, a break in a hydraulic line resulting in a loss of hydraulic pressure, a hydraulics off signal generated by an operator control or any one of a number of other reasons. When this occurs, power remains supplied to the control; and the servomechanism circuit may still produce an error signal. However, the drive mechanism is incapable of responding to the error signal and moving the machine element.

To execute the automatic realignment of the machine element after a power loss to the machine, the program store 15 contains a machine interface program 32 and a realignment program 34. The machine interface program 32 is comprised of a first routine 36 which is operative to store the command signal present at the interruption of power to the machine and a second routine 38 which is operative to store the error signal after the interruption of power to the machine. The realignment program 34 contains three routines. A first routine 40 aligns the servomechanism upon reapplication of power to the machine. A second routine 42 calculates the realignment distance to be moved after power is restored to the machine, and the routine 44 controls the execution of the realignment move by the machine element.

FIG. 2 is a detailed block diagram of the components in the servomechanism circuit which are required to implement the invention. A command signal generator 46 is responsive via an OR gate 48 to the output signals from the interpolator circuits 20. The command signal generator produces a command signal on line 50 representing the desired position of the machine element. A discriminator circuit 52 is responsive to the command signal and a feedback signal on line 54 from the feedback element 24. The feedback signal represents the actual position of the machine element. The discriminator 52 produces an error signal on line 56 to drive mechanism which moves the machine element to a position producing a feedback signal corresponding to the command signal. A reference signal generator 58 produces a reference signal to the feedback element 24.

When the CPU receives a signal from the push button panel 14 or the machine control contacts 17 indicating that power has been interrupted to the drive mechanism 28, the interpolation circuits 20 immediately cease operations; and the CPU 10 produces a first signal on line 60 to an AND gate 61 within a status selector circuit 62. The status selector circuit responds to the first signal to detect the command signal by clocking the status register 64 via OR gate 67 at a point in time determined by the reference signal. At this point in time, the command signal is input to the status register 64 and thereafter transferred to the nonvolatile memory 18 via line 66. After a predetermined period of time, as determined by the CPU 10, a second signal is produced on the line 63 to the AND gate 65 within the status selector 62. The status selector 62 responds to the second signal and detects the command signal on line 50 by clocking the status register via OR gate 67 at a point in time determined by the feedback signal on line 54. The command signal at this point in time is input to the status register 64 and thereafter transferred to the nonvolatile memory 18 via line 66.

The detection of the command signal relative to the feedback signal is equivalent to detecting the error signal after the predetermined period of time. Another limitation on the invention is that the error signal does not exceed the detection limits, i.e. the resolution, of the servomechanism. Subsequently, the error signal in the status register is transferred to the nonvolatile memory 18 via a line 66. Further, the absolute position store 30 which contains the position of the machine element relative to some predetermined reference responds to a signal from the CPU via line 68 which causes its contents to be transferred to the nonvolatile store via the line 70.

The nonvolatile store is operative to store the command signal, the error signal and the position signal for any practical period of time during which power is removed from the machine and control. When the CPU 10 detects that power is to be reapplied to the control and the machine, it permits power to be reapplied to the control but inhibits the supply of power to the machine. When power is reapplied to the control, a second signal is again transmitted via line 63 to the AND gate 65 of the status selector 62 which reads the command signal at a point in time determined by the feedback signal thereby storing a second error signal in the status register 64. This error signal is transmitted back to the CPU 10 via line 66. The CPU reverses the sign of the error signal and transmits it to the interpolation circuits via the line 72. The interpolation circuits operate to produce output signals through the OR gate 48 to the command signal generator 46 to change the command signal by a magnitude equal to the second error signal detected. Therefore, the error signal is forced to zero. This zero error signal is verified by the CPU 10 which thereafter generates signals causing power to be reapplied to the machine. Since the error signal is zero, there will be no input to the drive mechanism 28; and consequently, the machine element will remain substantially stable during the reapplication of power to the drive mechanism 28.

After power has been applied to the drive mechanism, the CPU 10 uses the calculate realignment distance routine 44 in conjunction with the command and error signals stored in the nonvolatile memory 18 to produce a realignment signal. The realignment signal represents the magnitude and direction of a realignment displacement which will place the machine element in the position it had when power to the machine was interrupted. Under further instructions defined by the execute realignment routine 44, the CPU 10 transmits the realignment signal to the align pulse counter 76 via line 74. Therefore, pulses are supplied via OR gate 48 to the command signal generator at a fixed rate and in a direction and quantity determined by the contents of the align pulse counter 76. With each pulse received by the command signal generator, a new command signal is generated on line 50 and supplied to the discriminator 52. This produces an error signal which causes the machine element to move through a distance defined by the realignment signal. At this point, the position signal is transferred from the nonvolatile store to the absolute position store 30. Therefore, after a loss of power to the machine and a subsequent reapplication of power thereto, the machine element is placed in the same position it had before power was terminated; and the absolute position store contains a position signal corresponding thereto.

Figures 3, 5:
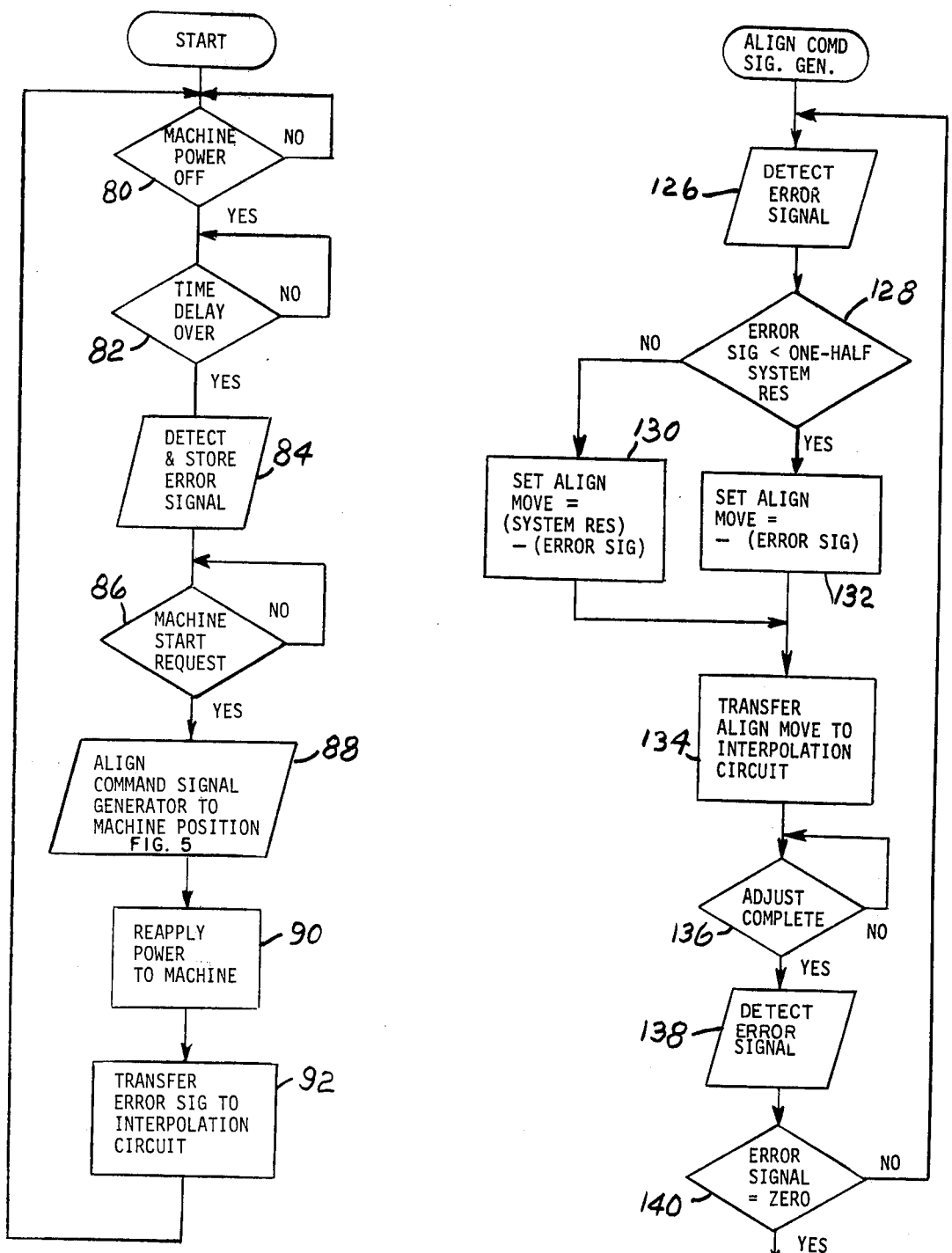
FIG. 3 is a flow chart illustrating the general method of the invention.
FIG. 5 is a detailed flow chart of a routine for automatically aligning a command signal generator to the actual position of a machine element during the reapplication of power.

FIG. 3 is a flow chart illustrating the general method of the realignment process. Before describing the details of the process, several points should be reviewed. First, the invention is only applicable to those situations in which a machine element experiences a displacement after the termination of power to the machine. Further, this displacement can occur in two general situations. In the first situation, it may be assumed that all of the displacement occurs from the beginning of a predetermined period of time when the power is terminated to the end of such time when the error signal is measured and stored. In this case, only the error signal need be stored. Upon reapplication of power to the machine, after the initial alignment of the servomechanism, the machine may be moved through a displacement corresponding to said error signal to achieve the position it had before the power interruption occurred. The second situation is identical to the first except that further machine motion may occur after the error signal is measured. However, this motion may not exceed one-half an electrical revolution of the feedback element. To compensate for this motion in the realignment process, the valve of the command signal at the time of loss of power to the machine must be stored and the magnitude of the command signal after the alignment process of the servomechanism must also be detected and stored. The value of these signals in combination with the stored error signal can then be used to calculate a further compensation motion also compensates for any changes that may occur in the servo balance offset. The process of FIG. 3 illustrates the steps required for realignment in the first situation discussed above.

Decision block 80 determines whether or not power to the machine has been interrupted. If it has, the process moves to block 82 which determines whether or not the predetermined time delay is over. After the predetermined time delay, the process moves to the subroutine 84 which corresponds to the routine 38 shown in the machine interface program 32 of FIG. 1 and measures the value of the error signal after the time delay using the status selector 62 of FIG. 2. This error signal magnitude is detected and stored in the nonvolatile memory. Next, decision block 86 determines whether a machine start signal has been requested, i.e. whether or not power is to be reapplied to the drive mechanism. If a request has been received, subroutine block 88 aligns the command signal generator to produce a zero error signal. This process corresponds to the align servomechanism routine 40 shown in the realignment program 34 of FIG. 1. After the servomechanism has been aligned, process block 90 causes power to be reapplied to the machine. Finally, process block 92 moves the machine back an amount corresponding to the stored error signal. This operation is executed by the routines 42 and 44 of the realignment program 34 shown in FIG. 1.

Figure 4:
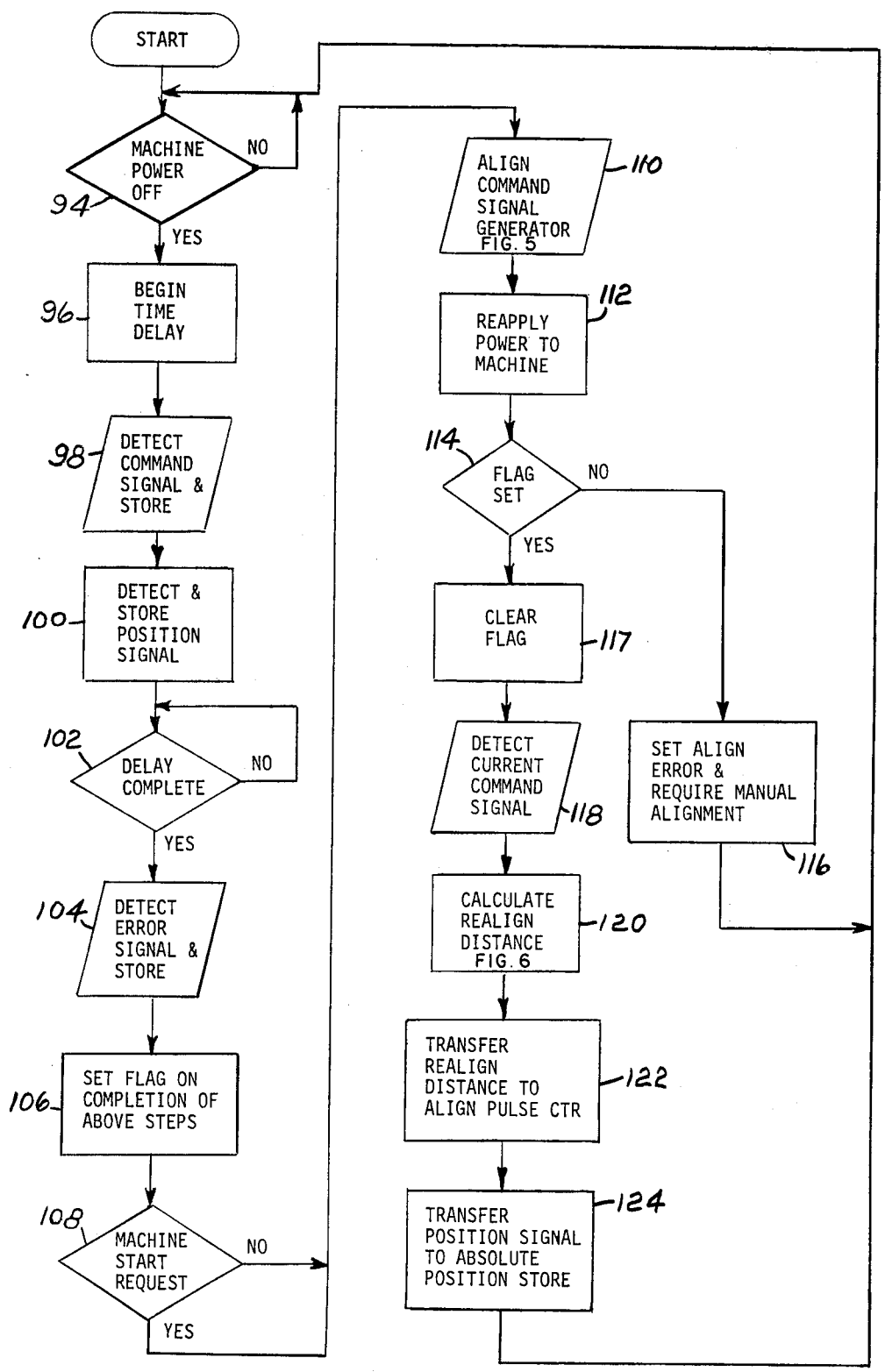
FIG. 4 is a detailed flow chart of a routine illustrating the steps required for automatically realigning a machine element to a predetermined position when the machine element experiences an undetected motion during the power interruption.

FIG. 4 is a detailed flow chart illustrating the steps required to realign the machine upon the reapplication of power in the situation where the machine element experiences a displacement after the error signal has been measured and stored. First, process block 94 determines whether or not a power interruption to the machine has occurred.

If power to the machine is terminated, subroutine block 96 initiates a time delay; and process block 98 detects the current command signal and causes the signal to be stored in the nonvolatile memory. It is assumed that the command signal does not exceed the measuring range of the servomechanism. Subroutine block 100 transfers the current position signal from the absolute position store 30 (see FIG. 2) to the nonvolatile memory. Next, decision block 102 determines whether or not the time delay is complete. This time delay may typically be approximately two seconds. The magnitude of the delay is a function of the expected worst case drift of a machine element after the machine power has been terminated. After the time delay is over, subroutine 104 measures the error signal and stores this signal in the nonvolatile memory. Where appropriate, the time delay sequence may be replaced by an iterative loop detecting a cessation of machine element motion after the termination of power. Next, process block 106 sets a flag indicating that the above steps in the process have been completed.

At this point in time, all the information for an automatic realignment cycle has been accumulated and stored; and therefore, the power to the control may be terminated. This may occur by the operator executing a fixed sequence shut down procedure, or the sequence may be built into the system as an automatic shut-down procedure in which the control power is maintained until after the time delay is complete following a termination of machine power.

Figure 6:
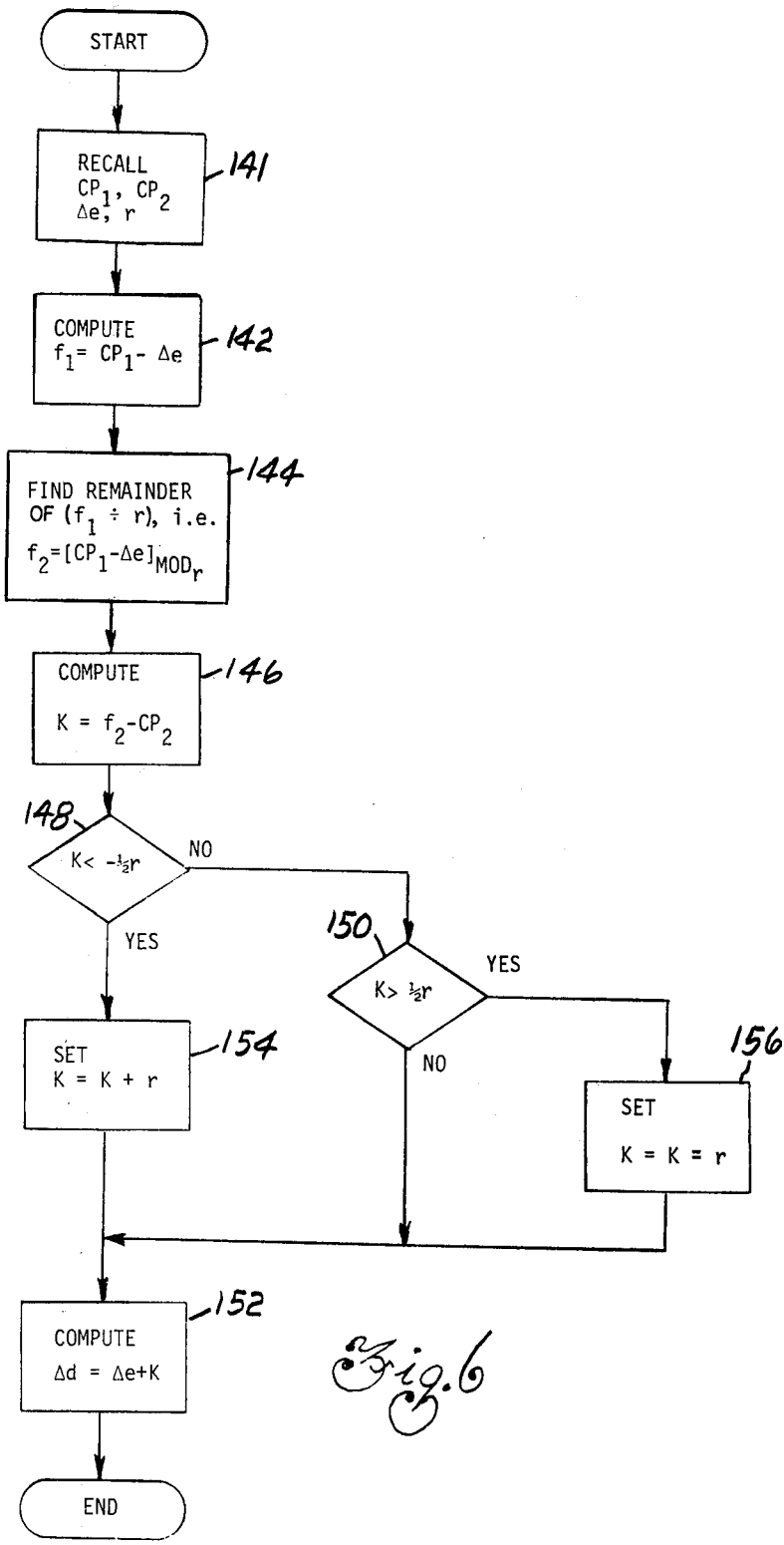
FIG. 6 is a detailed flow chart of a routine illustrating the steps required to determine the distance to be moved in the realignment of a machine element.

Decision block 108 determines when a machine start request has been made. This signal will generally be produced by a machine start push button located on the push button panel 14. If a machine start request is received, subroutine block 110 aligns the command signal generator to produce a zero error signal. Next, process block 112 generates the necessary signals to reapply power to the machine. Since the error signal is zero, the application of power to the drive mechanism will result in only a minimal amount of displacement of the machine element. Decision block 114 determines whether or not the flag defined in process block 106 has been set. If the flag has not been set the process moves to process block 116 which is operative to produce a visual indication that an alignment error exists. Therefore, a standard manual alignment procedure must be followed. If the flag in process block 106 has been set, process block 117 clears the flag. The process then moves to subroutine block 118 which causes the command signal which is generated by the command signal generator upon reapplication of power to be detected. Subroutine block 120 uses the command signals detected in block 118 and the command and error signals stored in the nonvolatile memory to calculate the magnitude and direction of a realignment move. As discussed in FIG. 3, if the machine element does not move after the error signal has been measured, the realignment move will have a magnitude equal to that of the measured error signal but with the opposite sign. If the machine element moves less than one-half an electrical revolution of the feedback element after the detection of the error signal, it must be moved back an amount equal to the error signal plus another distance which is determined by the command signals. The details of this calculation are shown in FIG. 6. Finally, subroutine block 122 causes the calculated realignment distance to be input to the command signal generator via the align pulse counter, thereby causing the machine element to move through the realignment displacement. At the end of this process, the machine element should be in the same position it occupied when the machine power was initially terminated. At this point, subroutine block 124 causes the position signal stored in the nonvolatile store to be transmitted to the absolute position store. Therefore, the position defined by the numerical control when machine power was interrupted corresponds to the actual position of the machine element after machine power has been reapplied.

FIG. 5 is a detailed flow chart illustrating the steps of a routine for aligning the command signal generator to produce a zero error signal before reapplying power to the machine. Process block 126 requires that the error signal be detected. Referring to FIG. 2, the error signal is detected by sampling the command signal at a point in time defined by the feedback signal. This error signal is input to the status register 64 and then transmitted back to the CPU.

The servomechanism associated with the disclosed apparatus is incremental in nature. In other words, the feedback signal generated by the feedback transducer is cyclic in nature. It produces a repetitive signal during each electrical revolution of the transducer. Therefore, the feedback signal only produces unique values within any one of the electrical revolutions. Many systems, including the disclosed system have range extension circuits which extend the unique range of the feedback transducer by several electrical revolutions. Typically, on a profile milling machine, the resolution of the feedback signal may be two hundred-thousandths of an inch per revolution of the resolver. If the electrical resolution of the system is one pulse per one ten-thousandths of an inch of motion, then the resolution can be expressed as two thousand pulses per revolution. With a range extension capability, the resolution may be extended 2, 4, 8 etc. times.

Decision block 128 determines the relative location of the magnitude of the error signal within the resolution range of the servomechanism. This block decides in which direction to clock the command signal generator to achieve the desired alignment in the shortest period of time. If the error signal has a magnitude in the first half of the resolution range of the system, process block 132 sets the alignment move equal to the magnitude of the measured error signal but of the opposite polarity. If the error signal has a magnitude in the second half of the resolution range of the system, process block 130 sets the alignment move equal to the difference between the total resolution range and the magnitude of the error signal.

Process block 134 causes the magnitude of the alignment move to be transferred to the interpolation circuits 20 shown in FIG. 2. The interpolation circuits 20 transmit signals to the command signal generator 46 to change the command signal by an amount equal to the alignment move. Decision block 136 determines whether or not this move is complete. If the move is complete, process block 138 again detects the following error in a manner similar to that described in process block 126. Decision block 140 determines whether or not the error signal is zero. If the error signal is not zero, the process returns to block 126 and is repeated. If the error signal is zero, the process moves on to process block 112 shown in FIG. 4, the machine power is reapplied.

FIG. 6 is a detailed flow chart illustrating the steps of a routine for calculating the realignment distance. Process block 141 operates to recall $cp_1$— the command signal at power off, $cp_2$— the command signal at power on, $\Delta e$ — the error signal measured after the time delay and $r$— the resolution of the servomechanism in bits/rev. In process block 142, the stored error signal $\Delta e$ detected in subroutine block 104 of FIG. 4, is subtracted from the first command signal $cp_1$ detected in subroutine block 98 of FIG. 4. In block 144, the difference determined above is divided by the resolution of the servomechanism and the remainder thereof represents a second function. In process block 146, the second command signal which was detected in subroutine block 118 in FIG. 4 is subtracted from the second function. This difference represents an initial change in displacement $k$. Next, decision block 148 determines whether or not this initial change in displacement is less than minus one-half the resolution of the servomechanism. Decision block 150 determines whether or not the initial alignment displacement is greater than one-half the resolution of the system. If the initial change in displacement is greater than minus one-half the resolution and less than plus one-half the resolution, process block 152 calculates a final realignment displacement $\Delta d$ by adding the magnitude of the error $\Delta e$ to the initial realignment displacement value $k$. If the initial realignment displacement is less than minus one-half the resolution of the system, process block 154 increases the magnitude of the initial alignment displacement by a magnitude equal to the resolution of the servomechanism. Similarly, if the initial alignment displacement is greater than a positive one-half resolution of the servomechanism, process block 156 diminishes the magnitude of the initial value by the magnitude of the resolution of the servomechanism. The adjusted values of the initial realignment displacements are then input to process block 152 wherein the final realignment displacement is calculated. At this point, the process moves on to block 122 in FIG. 4 which requires that the final realignment displacement be transferred to the align pulse counter 76.

While the invention has been illustrated in some detail according to the preferred embodiments shown in the accompanying drawings, and while the preferred embodiments have been described in some detail, there is no intention to thus limit the invention to such detail. On the contrary it is intended to cover all modifications, alterations and equivalents falling within the spirit and scope of the appended claims.

What is claimed is:

1. An apparatus for automatically realigning a machine element to a commanded position in response to a first signal representing an interruption of power to a drive mechanism connected to the machine element and a second signal representing a reapplication of power to the drive mechanism, said drive mechanism being controlled by a servomechanism circuit responding to a command signal representing the desired position of the machine element and producing a feedback signal representing the actual position of the machine element, the apparatus comprising:
   a. means responsive to the servomechanism circuit and the first signal for detecting an error signal representing the displacement of the machine element after the power interruption;
   b. means responsive to the detecting means for storing the error signal; and
   c. means responsive to the second signal and the error signal for producing a command signal to the servomechanism circuit to cause the machine element to move to the commanded position it had at the time of the interruption of power.

2. An apparatus for automatically realigning a machine element to a commanded position in response to a first signal representing an interruption of power to a drive mechanism connected to a machine element and a second signal representing a reapplication of power to the drive mechanism, said drive mechanism being controlled by a servomechanism circuit including 1. a reference signal generator for producing a reference signal,
2. a command signal generator for producing a command signal representing a desired position of the machine element,
3. a feedback transducer responsive to the reference signal and in mechanical communication with the machine element for producing a feedback signal representing the actual position of the machine element, and
4. a discriminator circuit connected to the command signal generator and the feedback transducer for producing an error signal representing the difference between the command and feedback signals, the apparatus comprising:
   a. means responsive to the first signal and the command signal generator for detecting a first command signal representing the desired position of the machine element at the time of the power interruption;
   b. means responsive to the servomechanism circuit for detecting a first error signal representing the displacement of the machine element over a period of time after the power interruption;
   c. a storage means responsive to the detecting means for storing the first command signal and the first error signal;
   d. means responsive to the second signal and the command signal generator for detecting a second command signal representing the position of the machine element upon the reapplication of power; and
   e. means responsive to the first and second command signals and the first error signal and connected to the command signal generator for producing a realign signal to cause the command signal generator to produce a third command signal to move the machine element to the commanded position which it had at the time of the interruption of power.

3. The apparatus of claim 2, wherein the means for detecting the first command signal further comprises:
   a. a buffer store connected to the command signal generator;
   b. means responsive to the reference signal generator and the first signal and connected to the buffer store for detecting the first command signal with respect to the reference signal in response to the first signal and transferring the first command signal to the buffer store; and
   c. means for transferring the first command signal from the buffer store to the storage means.

4. The apparatus of claim 3, wherein the means for detecting the first error signal further comprises:
   a. means responsive to the feedback transducer and connected to the buffer store for detecting the first command signal with respect to the feedback signal after a predetermined period of time thereby generating the first error signal and transferring said first error signal to the buffer store; and
   b. means for transferring the first error signal from the buffer store to the storage means.

5. The apparatus of claim 4, wherein apparatus further produces a third signal representing a request to reapply power to the drive mechanism and the means for detecting the second command signal further comprises:

a. means responsive to the third signal, the feedback transducer and connected to the buffer store for detecting the command signal with respect to the feedback signal thereby producing a second error signal and transferring the second error signal to the buffer store;

b. means responsive to the second error signal and connected to the command signal generator for causing the command signal generator to produce a command signal resulting in the error signal having a zero magnitude; and c. means responsive to the reference signal generator and connected to the buffer store for detecting the second command signal with respect to the reference signal in response to the error signal having a zero value.

6. The apparatus of claim 5, wherein the means for producing the realign signal further comprises means for providing the realign signal to the command signal generator to cause the machine element to be displaced in accordance with the following expression:

let $k = [cp_1 - \Delta e]_{MOD_r} - cp_2$ where $[A]_{MOD_B}$ represents the remainder of $A \div B$ if $-\frac{1}{2}r \leq k \leq \frac{1}{2}r$ $\Delta d = \Delta e + k$ if $k < -\frac{1}{2}r$ $\Delta d = \Delta e + k + r$ if $k > \frac{1}{2}r$ $\Delta d = \Delta e + k - r$ where
$\Delta d$ = realignment displacement
$r$ = counts/rev. of servomechanism
$cp_1$ = first command signal
$cp_2$ = second command signal
$\Delta e$ = error signal.

7. The apparatus of claim 6 wherein the storage means further comprises a nonvolatile store.

8. A method for automatically realigning a machine element to a commanded position in response to an interruption and subsequent reapplication of power to a drive mechanism connected to the machine element, said drive mechanism being controlled by a servomechanism circuit responsive to a command signal and a feedback signal produced by a feedback transducer in mechanical communication with the machine element, the method comprising the steps of:

a. detecting the termination of power to the drive mechanism;

b. detecting in response to the command and feedback signals a displacement signal representing the movement of the machine element after the termination of power;

c. storing the displacement signal;

d. reapplying power to the drive mechanism;

e. generating a realignment signal in response to the displacement signal; and f. transferring the realignment signal to the servomechanism circuit thereby causing the machine element to move to the commanded position, it had at the time of the interruption of power.

9. A method responsive to the interruption of power to a drive mechanism connected to a machine element for automatically realigning the machine element to a predetermined position after the reapplication of power to the drive mechanism, said drive mechanism being controlled by a servomechanism circuit producing an error signal in response to a command signal and a feedback signal, said feedback signal being produced by a feedback transducer responsive to a reference signal and in mechanical communication with the machine element, the method comprising the steps of:

a. detecting the termination of power to the drive mechanism;

b. detecting in response to the command and reference signals a first command signal representing the desired position of the machine element at the termination of power;

c. storing the first command signal;

d. detecting after a period of time a first error signal in response to the command and feedback signals, said first error signal representing the displacement of the machine element after the termination of power;

e. storing the first error signal;

f. reapplying power to the drive mechanism;

g. detecting in response to the command and reference signals a second command signal representing the current position of the machine element upon the reapplication of power;

h. generating a realignment signal in response to the first and second command signals and the error signal; and i. transferring the realignment signal to the servomechanism circuit to move the machine element to the predetermined position.

10. The method of claim 9, wherein the step of generating a realignment signal further comprises the step of calculating a realignment displacement in accordance with the following expression:

let $k = [cp_1 - \Delta e]_{MOD_r} - cp_2$ where $[A]_{MOD_B}$ represents the remainder of $A \div B$ if $-\frac{1}{2}r \leq k \leq \frac{1}{2}r$ $\Delta d = \Delta e + k$ if $k > -\frac{1}{2}r$ $\Delta d = \Delta e + k + r$ if $k > \frac{1}{2}r$ $\Delta d = \Delta e + k - r$ where $\Delta d$ = realignment displacement
$r$ = counts/rev. of servomechanism
$cp_1$ = first command signal
$cp_2$ = second command signal
$\Delta e$ = error signal.

11. A method for realigning a machine element to a predetermined position in response to an interruption and a subsequent reapplication of power to a drive mechanism connected to the machine element, said drive mechanism being controlled by a servomechanism circuit including in part a descriminator circuit for producing an error signal to the drive mechanism in response to 1. a command signal representing a desired position of the machine element and being produced by command signal generator, and 2. a feedback signal representing the actual position of the machine element and being produced by a feedback transducer responsive to a reference signal and in mechanical communication with the machine element, the method comprising the steps of:

a. detecting the termination of power to the drive mechanism;

b. detecting after a predetermined period of time a first error signal in response to the command and feedback signals, said first error signal representing a first displacement of the machine element during the predetermined period of time after the termination of power;

c. storing the first error signal in a nonvolatile memory;

d. detecting a request to reapply power to the drive mechanism;

e. modifying the operation of the command signal generator to produce a first command signal equal to the feedback signal thereby producing a zero error signal;

f. reapplying power to the drive mechanism; and g. generating a realignment signal in response to the first error signal; and h. transferring the realignment signal to the command signal generator to cause the machine element to move through a displacement equal in magnitude by opposite in sign to the first displacement.

12. A method responsive to the interruption of power to a drive mechanism connected to a machine element for automatically realigning the machine element to a commanded position in response to the reapplication of power to the drive mechanism, said drive mechanism being controlled by a servomechanism circuit including a discriminator circuit for producing an error signal to the drive mechanism in response to 1. a command signal representing a desired position of the machine element and being produced by a command signal generator, and 2. a feedback signal representing the actual position of the machine element and being produced by a feedback transducer responsive to a reference signal and in mechanical communication with the machine element, the method comprising the steps of:

a. detecting the termination of power to the drive mechanism;

b. detecting, in response to the command and reference signals, a first command signal representing the commanded position of the machine element upon the termination of power;

c. storing the first command signal in a nonvolatile store;

d. detecting after a period of time a first error signal in response to the command and feedback signals, said first error signal representing the displacement of the machine element during the period of time after the termination of power;

e. storing the first error signal in the nonvolatile store;

f. detecting a request to reapply power to the drive mechanism;

g. aligning the command signal generator to produce a second command signal equal to the current feedback signal thereby producing a zero error signal;

h. reapplying power to the drive mechanism in response to the zero error signal;

i. detecting in response to the command and reference signals a current command signal representing the current position of the machine element upon the reapplication of power;

j. generating a realignment signal in response to the first and current command signals and the first error signal; and k. transferring the realignment signal to the command signal generator to cause the machine element to move to the commanded position.

13. The method of claim 12, wherein the step of generating a realignment signal further comprises the steps of:

a. producing a first realignment signal to cause the machine element to move through a displacement represented by the first error signal; and b. producing a second realignment signal to cause the machine element to move through a displacement defined by the first and current command signals and the first error signal.

14. The method of claim 13, wherein the step of producing the second realignment signal further comprises the step of calculating a realignment displacement in accordance with the following expression:

$$k_1 = [cp_1 - \Delta e]_{MOD_r} - cp_2$$

where $[A]_{MOD_B}$ represents the remainder of $A \div B$ if $-\frac{1}{2}r \leq k_1 \leq \frac{1}{2}r$; $k = k_1$
if $k_1 < -\frac{1}{2}r$; $k = k_1 + r$
if $k_1 > \frac{1}{2}r$; $k = k_1 - r$ where
$k$ = magnitude of the second realignment signal
$cp_1$ = first command signal
$cp_2$ = second command signal
$\Delta e$ = first error signal
$r$ = counts/rev. of servomechanism.

15. The method of claim 12, wherein the servomechanism circuit further includes an accumulator for storing a position signal representing the algebraic sum of the command signals wherein the process further includes the steps of:

a. storing the position signal in the nonvolative store upon the termination of power; and b. reestablishing the position signal in the accumulator in response to the machine element being moved back to the predetermined position.

* * * * *